(12) United States Patent
Williams

(10) Patent No.: US 6,453,744 B2
(45) Date of Patent: Sep. 24, 2002

(54) LOW RADIATION CAPTURE CROSS-SECTION ELECTRODE MATERIAL FOR PROMPT RADIATION ENVIRONMENTS

(75) Inventor: John T. Williams, Marysville, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/853,418

(22) Filed: May 10, 2001

Related U.S. Application Data

(60) Provisional application No. 60/202,995, filed on May 10, 2000.

(51) Int. Cl.[7] .......................... G01C 19/00; G01P 15/10
(52) U.S. Cl. .................. 73/504.12; 73/514.29
(58) Field of Search .................. 73/504.01, 504.02, 73/504.12, 514.15, 514.29, 514.34, 649, 651

(56) References Cited

U.S. PATENT DOCUMENTS

| | | | | |
|---|---|---|---|---|
| 5,948,981 A | * | 9/1999 | Woodruff | 73/514.29 |
| 5,996,411 A | * | 12/1999 | Leonardson et al. | 73/514.29 |
| 6,119,520 A | * | 9/2000 | Woodruff | 73/514.29 |

\* cited by examiner

Primary Examiner—Richard A. Moller

(57) ABSTRACT

A transducer for use in any of an accelerometer, a piezo-resistive strain gauge, a piezoelectric transducer, and surface acoustic wave transducers, the transducer having a beam and an electrode deposited on the beam, wherein the electrode is formed of a material having properties as compared to gold of: a low radiation capture cross-section, and high electrical conductivity.

21 Claims, 2 Drawing Sheets

LOW RADIATION CAPTURE CROSS-SECTION ELECTRODE MATERIAL FOR PROMPT RADIATION ENVIRONMENTS

This application claims the benefit of U.S. Provisional Application Serial No. 60/202,995, filed in the name of John T. Williams on May 10, 2000, the complete disclosure of which is incorporated herein by reference.

FIELD OF THE INVENTION

This invention is in the field of vibrating beam accelerometers and the method of manufacturing the same, and in particular to the metal employed in fabricating the surface electrodes on the vibrating beams.

BACKGROUND OF THE INVENTION

Oscillators, such as clock crystal oscillators, surface acoustic wave sensors, and various vibrating beam transducers are typically formed of such materials as silicon, quartz, and zirconia with surface electrodes formed of metal. The electrode material is usually gold, which is a highly stable and electrically conductive noble metal. Under benign circumstances, the gold electrodes function effectively. However, the radiation capture cross-section of gold to gamma radiation is relatively high. When such devices having gold electrodes are exposed to radiation environments, gamma capture due to the high radiation capture cross-section results in heating of the electrode material. The heating causes strain between the thermally mis-matched materials, which in turn causes bias errors. Over time the bias errors build up, thereby reducing the quality of the information output by the device.

A widely used technique for force detection and measurement employs a mechanical resonator having a frequency of vibration proportional to the force applied. The resonators is often formed of tuned beams of a material, such as silicon, quartz, or zirconia, with metal electrodes deposited on a surface thereof. The surface electrodes are usually formed of gold. In one such mechanical resonator, the beams are coupled between an instrument frame and a proof mass suspended by a flexure. usually formed of gold. In one such mechanical resonator, the beams are coupled between an instrument frame and a proof mass suspended by a flexure.

In operation, a drive voltage is applied to the surface electrodes to cause the beams to vibrate transversely at a resonant frequency. The vibration frequency is monitored in the same or other surface electrodes. The beam vibration frequency changes as the result of tensile and compressive forces applied to the accelerometer by changes in external acceleration. The acceleration force applied to the proof mass is quantified by measuring the change in vibration frequency of the beams. Such vibrating beam accelerometers are more fully described in each of U.S. Pat. No. 5,334,901, entitled VIBRATING BEAM ACCELEROMETER; U.S. Pat. No. 5,456,110, entitled DUAL PENDULUM VIBRATING BEAM ACCELEROMETER; U.S. Pat. No. 5,456,111, entitled CAPACITIVE DRIVE VIBRATING BEAM ACCELEROMETER; U.S. Pat. No. 5,948,981, entitled VIBRATING BEAM ACCELEROMETER; U.S. Pat. No. 5,996,411 entitled VIBRATING BEAM ACCELEROMETER AND METHOD FOR MANUFACTURING THE SAME; and U.S. Pat. No. 6,119,520, entitled METHOD FOR MANUFACTURING A VIBRATING BEAM ACCELEROMETER, the complete disclosures of which are incorporated herein by reference. Vibratory force transducers have been fabricated from a body of semiconductor material, such as silicon, by micromachining techniques. Existing techniques for manufacturing these miniature devices are described in U.S. Pat. No. 5,006,487, entitled METHOD OF MAKING AN ELECTROSTATIC SILICON ACCELEROMETER and 4,945,765 entitled SILICON MICROMACHINED ACCELEROMETER, the complete disclosures of which are incorporated herein by reference.

SUMMARY OF THE INVENTION

The present invention provides minimization of the time that bias errors persist, thereby reducing the build up of position and velocity errors of inertial navigation systems. Minimization of the time that the bias error persists is accomplished by the present invention by reducing the thermal time constant of the error driver, which is the thermal gradients in the crystal resonator. Minimization of the thermal gradients in the crystal resonator is provided by utilization of an electrode material that is formed of a material having properties as compared to gold of a low radiation capture cross-section and a high electrical conductivity. Preferably, the electrode material is a metal. The low radiation capture cross-section is a radiation capture cross-section to gamma radiation that is low as compared with gold. The radiation capture cross-section to gamma radiation as compared to gold is less than 0.75, and preferably less than about 0.55. The electrical conductivity of the material is comparable to gold. For example, the electrical conductivity of a preferred material is greater than about $5 \times 10^6$ Ohm-meters.

According to one aspect of the invention, the electrode material is a material, preferably a metal, selected from a group of materials that exhibit the desired properties. For example, the preferred material is one selected from the group consisting of aluminum, chrome, molybdenum, and other equivalent materials that exhibit the desired properties. Additionally, the preferred materials exhibit a low thermal coefficient of expansion and are depositable on the transducer beam or beams in thin films according to conventional methods well-known in the art.

The present invention further provides a transducer for use in any of an accelerometer, a piezo-resistive strain gauge, a piezoelectric transducer, and a surface acoustic wave transducer, the transducer having a beam and an electrode deposited on the beam, wherein the electrode is formed of a material having properties as compared to gold of: a low radiation capture cross-section, and high electrical conductivity.

According to other aspects of the invention, the present invention provides methods of forming a vibrating beam transducer having electrodes that exhibit the above mentioned desired properties.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

An exemplary embodiment of the invention is described below in connection with vibrating beam transducers in an accelerometer. However, the described embodiment is only an example and is not intended to limit the scope of the claimed invention. While the exemplary embodiment is an accelerometer, the invention is equally applicable to a variety of devices, including: clock crystal oscillators; various strain sensors, such as surface acoustic wave (SAW) sensors used in cellular telephones; and various vibrating beam transducers. The invention is useful in devices that are affected by heat deformation due to radiation capture independent of the drive circuit, the device material, and the mode of vibration.

Figure 1:
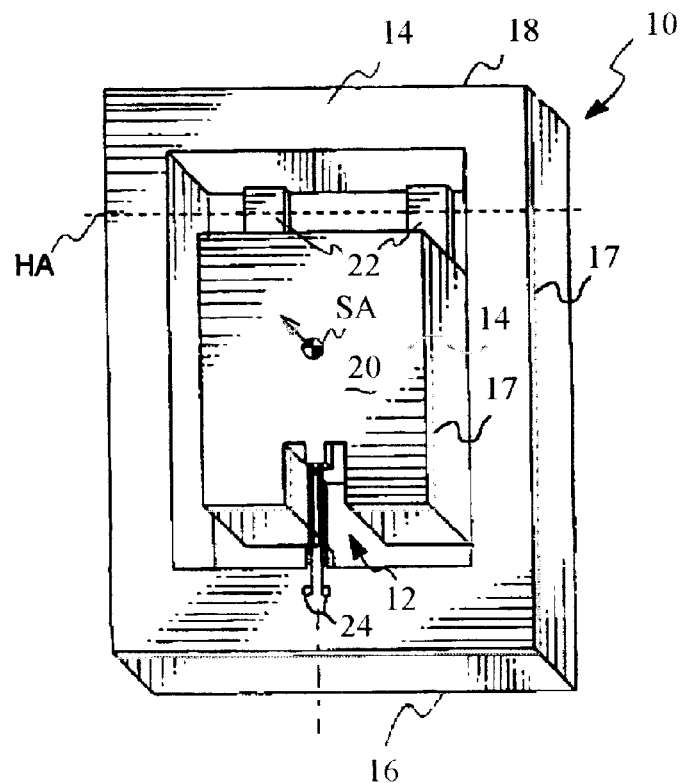
FIG. 1 illustrates an exemplary embodiment of the double-ended tuning fork accelerometer of the invention.

FIG. 1 illustrates a simple micromachined vibrating beam accelerometer 10. More complex versions of accelerometers employing multiple vibrating beam transducers and methods of manufacturing the same are provided in each of above incorporated U.S. Pat. No. 5,334,901; U.S. Pat. No. 5,456,110; U.S. Pat. No. 5,456,111; U.S. Pat. No. 5,948,981; U.S. Pat. No. 5,996,411; and U.S. Pat. No. 6,119,520. Accelerometer 10 is formed with a vibrating beam transducer 12 (shown as a dual vibrating beam transducer) in an active layer 14 coupled to the surface of a substrate 16 through a thin insulating layer 17. Preferably, the substrate 16 and active layers 14 are made from a silicon or polysilicon material, and the insulating layer is a thin layer, e.g., about 0.1 to 10 micrometers, of oxide, such as silicon oxide or another suitable insulating material. The substrate 16 includes a frame 18 and a proof mass 20 suspended from the frame 18 by one or more flexures 22 for rotation about an input axis HA, commonly known as the "hinge" axis, in response to an applied acceleration force along a sensitive axis SA.

Proof mass 20 is formed from the substrate 16 by etching a slot 24 through the substrate 16 and suitably etching around inner flexures 22. Flexures 22 are preferably etched near or at the center of the substrate 16, i.e., substantially centered between the opposing upper and lower surfaces. Preferably, flexures 22 are formed using well-known time etching techniques, which entails precision timed etching from both surfaces to form thin flexure hinges. This arrangement provides an input axis HA, i.e., the axis about which proof mass 20 rotates in response to an applied force, that extends substantially through the center of mass of the substrate 16, which reduces the skew of the input axis HA relative to the mass of the proof mass 20, thereby improving the accuracy of the accelerometer 10. Flexures 22 are preferably spaced from each other and define an effective hinge point centered therebetween. Alternatively, a single flexure (not shown) may be formed at the hinge point. Preferably, flexures 22 are designed to limit S-bending. To this end, flexures 22 preferably have a short length, or they each comprise a right circular optimized hinge. A pseudo right circular hinge may be formed by precision time etching along etch planes, as described in detail in above incorporated U.S. Pat. No. 5,996,411, which also describes in detail that separate etching may also be performed to round the hinge geometry to form an ideal right circular hinge.

Vibrating beam transducer 12 and the appropriate electrical bonds 26 for coupling transducer 12 to an oscillator circuit are formed on the active layer 14 by suitable etching techniques, such as reactive ion etching, anisotropic etching or the like. In one embodiment, openings (not shown) are formed in the insulating layer to electrically couple electrical bonds 26 of the transducer 12 to the substrate 16 and to mechanically couple the transducer 12 to the proof mass 20 and an inner portion of the frame 18. The vibrating beam transducer 12 is thus electrically coupled to the oscillator circuit through electrodes 26. Alternatively, electrical bonds 26 may be directly coupled to the drive and sense circuits (not shown). Preferably, the remaining portions (not shown) of the active layer 14 are then removed to minimize disturbances to the active components.

The vibrating beam transducer 12 includes a pair of beams which are driven by a well-known oscillator circuit, described below, to oscillate at their resonance frequency in the plane of the beams. Such transducers 12 are known as force-to-frequency transducers since a change in the force applied to the transducer will result in a change of the resonant frequency of the transducer. In particular, a tension force applied along an axis generally parallel to the beams will cause an increase of the resonant frequency while a compression force will generally decrease the resonant frequency. The vibrating beam transducer 12 is mechanically coupled between the frame 18 and the proof mass 20 for detecting a force applied to the proof mass 20. An applied acceleration force along a sensitive axis SA rotates proof mass 20 about input axis HA. Such rotation subjects the vibrating beam transducer 12 alternatively to a tension or compression force, depending upon whether the input acceleration is positive or negative.

Figure 2:
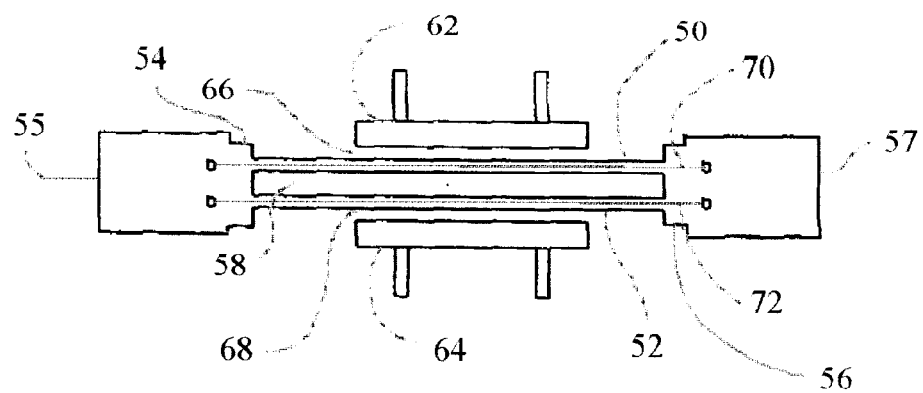
FIG. 2 illustrates one exemplary embodiment of the vibrating beam transducer of the invention.

FIG. 2 illustrates the vibrating beam transducer 12 in detail. Vibrating beam transducer 12 comprises a pair of generally parallel beams 50, 52 coupled together at enlarged or widened end portions 54, 56 and separated from each other by a slot 58 to form a double ended tuning fork. Beam 12 are separated from substrate 16 so that the beams 50, 52 may be vibrated laterally relative to fixed end portions 54, 56, as discussed below. End portions 54, 56 are suitably bonded to proof mass 20 and frame 18, respectively, by mounting pads 55, 57. Widened end portions 54, 56 are provided to mechanically couple the vibrating beams 50, 52 to each other.

Of course, it should be recognized that the present invention is not limited to the double-ended tuning fork described above and shown in FIGS. 1 and 2. For example, accelerometer 10 may incorporate a single beam or a variety of other mechanical resonator arrangements. However, a double-ended tuning fork arrangement is generally preferred because beams 50, 52 can be driven laterally in opposite directions relative to each other, i.e., 180 degrees out of phase. Driving beams 50, 52 in opposite directions minimizes the transfer of energy from the moving beams to the rest of the components in accelerometer 10, which increases the effectiveness of the transducer.

Transducer 12 further includes an electrostatic drive for laterally vibrating beams 50, 52 at the resonance frequency. The electrostatic drive includes a pair of elongate electrodes 62, 64 located on either side of beams 50, 52, respectively. Electrodes 62, 64 are generally parallel to and laterally spaced from beams 50, 52 by gaps 66 and 68, respectively. Electrodes 62, 64 are etched from active layer 14 and doped with a suitable conductive material to create the necessary charge carriers and to facilitate completion of the electrical circuit. Alternatively, the electrodes 62, 64 may be formed from an electrically conductive material, such as gold, that is bonded to active layer 14.

A temperature gradient can build up across the vibrating beam transducer 12 due to shielding effects when the accelerometer 10 is exposed to gamma radiation. The temperature gradient build up becomes even more pronounced when the surface electrodes 70 and 72, which provide circuit paths for driving and sensing currents, have a high radiation capture cross-section. Gold, which is used in the prior art to form the surface electrodes 70 and 72, has such a high radiation capture cross-section, having an atomic number of 79 and an atomic weight of 197. The gold electrode material of the prior art heats as a result of radiation capture. Heating of the gold surface electrodes 70 and 72 results in a temperature gradient build up between the surface electrodes 70 and 72 and the beams 50 and 52 of transducer vibrating beam transducer 12. Strain of the beams 50 and 52 results from this temperature gradient, and the thermal coefficient of expansion difference between the electrodes 70 and 72 and the underlying structure of beams 50 and 52 causes uncontrolled and uncompensated beam deformation and bias shift, which compromises the accuracy of the output of accelerometer 10. The deformation can directly change the resonant frequency of the vibrating beams 50 and 52 by changing the relative stiffness of the resonant mode. The signal processing electronics interpret the change in resonant mode stiffness as an external acceleration, introducing error into the output of accelerometer 10.

Vibrating beam accelerometers are often used in inertial navigation systems onboard private and commercial aircraft and various military hardware. The position and velocity errors of the inertial navigation system builds up as a roughly linear function of time in response to a sudden bias error, Schuler tuning and Kalman filtering make the mission error determination a more complex function.

According to the present invention, the electrodes 50 and 52 applied to the accelerometer 10 are made of a material that has a low radiation capture cross-section, whereby thermal gradients are minimized in radiation environments, thereby minimizing bias error. The present invention provides a vibrating beam transducer 12 that minimizes the effects of gamma radiation. According to the present invention, each electrode in the vibrating beam accelerometer 10 is fabricated of a material that has a low radiation capture cross-section, but retains high electrical conductivity properties. When subjected to gamma radiation, the electrodes capture much less radiation than the gold electrodes of the prior art, and thus experience much less thermal heating. Additionally, preferred electrode materials have high thermal conductivity, which dissipates the heat quickly and further mitigates the effects of the radiation capture. Thus, the reduction of temperature effects of the improved material reduces accumulated navigation errors due to radiation-induced frequency errors.

According to the present invention, aluminum is a preferred material for forming the electrodes in the vibrating beam accelerometer 10. Aluminum closely matches the criteria defined above: a low radiation capture cross-section, high electrical conductivity. Aluminum also has a high thermal conductivity. Furthermore, aluminum can be deposited in thin films while retaining its high thermal and electrical conductivity, and low radiation capture cross-section. Chrome is another preferred material that meets the above invention criteria. Molybdenum is yet another preferred material that meets the above invention criteria. Each of these preferred material electrodes 50 and 52 are applied to the accelerometer substrate 16 material by conventional deposition methods well-known in the art. Other materials, including metals, having similar properties are considered equivalent for purposes of the invention and are contemplated by the scope of the following claims. The following table provides a comparison of material properties for these metals:

| Material | Thermal CONDUCTIVITY (BTU/hr/ft$^2$-° F.) | Thermal Coefficient of Expansion (ppm/° C.) | Relative X-Section To Gamma RADIATION | Electrical Conductivity (x10$^6$ 0 hm-m) |
|---|---|---|---|---|
| Gold | 169 | 14.2 | 1 | 45 |
| Chrome | 50 | 4.9 | 0.37 | 8 |
| Aluminum | 90 | 24 | 0.14 | 38 |
| Molybdenum | 73 | 4.8 | 0.53 | 20 |

The accelerometer 10 shown in FIGS. 1 and 2 can be fabricated in a number of alternative ways using conventional silicon micromachining techniques, as described in the above incorporated U.S. Patents and other well-known references. For example, the silicon substrate 16 can be formed from a generally planer and rectangular substrate formed from a P-type material with surfaces oriented along various crystal planes. An N-type epitaxial layer 14 can be grown on a surface thereof. The substrate 16 is then etched to form the structures illustrated in FIGS. 1 and 2, with electrochemical etch stops used to prevent etching of the force transducer 12 from the epitaxial layer 14 and the flexure 22 from the epitaxial layer 14, while deep etching of the bulk silicon is being performed.

While the preferred embodiment of the invention has been illustrated and described, it will be appreciated that various changes can be made therein without departing from the spirit and scope of the invention. For example, accelerometer 10 of the invention is alternatively used in combination with one or more additional accelerometers 10 mounted orthogonally thereto to form a two- or three-dimensional acceleration sensing device for use in devices requiring multi-axial directional sensing and/or guidance.

Furthermore, although the accelerometer 10 has been described utilizing a vibrating beam force transducer, the principals of the present invention are also applicable to accelerometers which use other types of transducers, such as piezo-resistive strain gauges, piezoelectric transducers and surface acoustic wave transducers. In all embodiments, it is desirable to match the thermal coefficient of expansion of the transducers to the coefficient of expansion of the material from which the proof masses and supports are fabricated to minimize thermal restraints on the transducers. This is accomplished in silicon micromachined devices by controlling doping concentrations.

Figure 3:
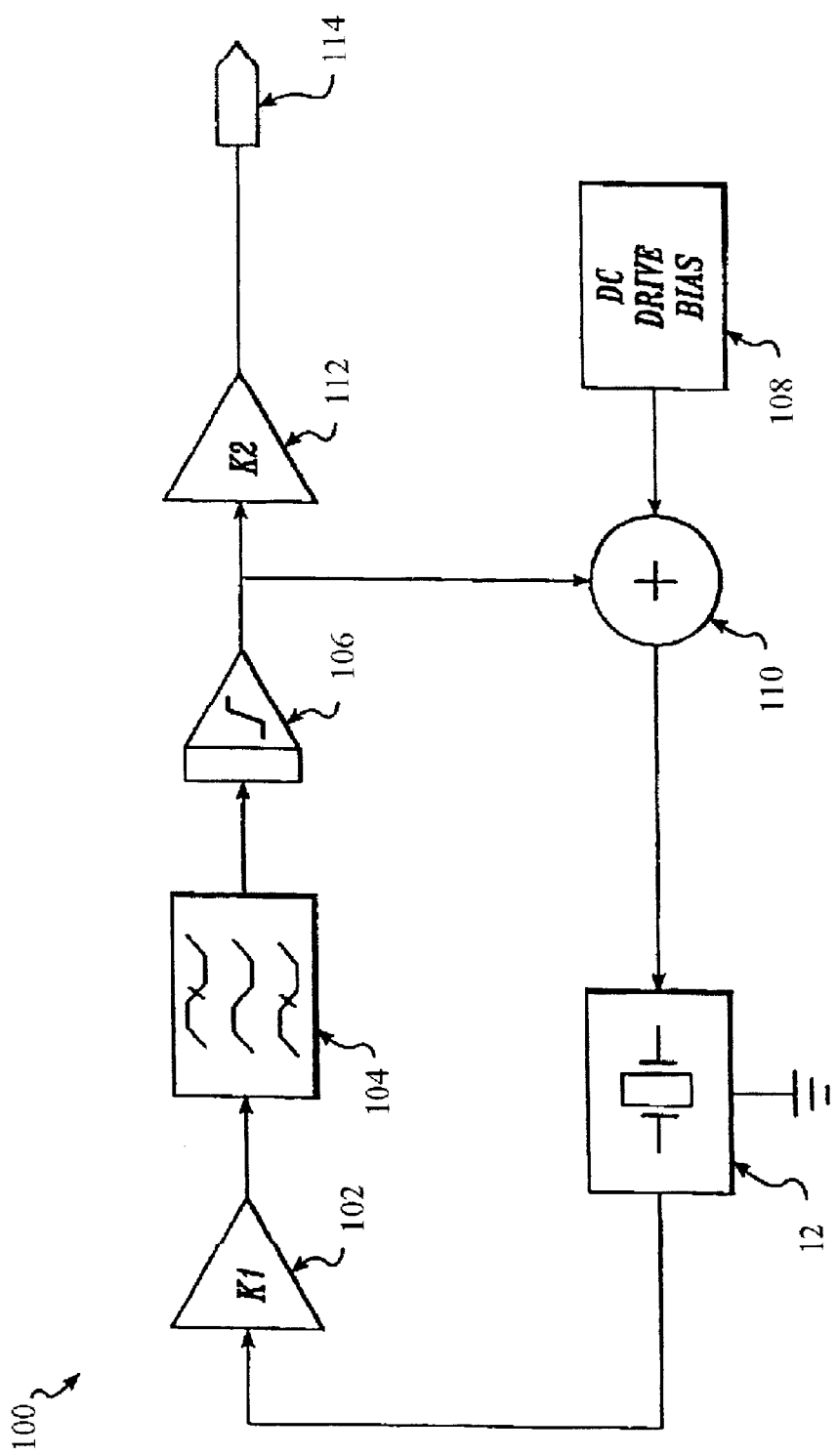
FIG. 3 illustrates one embodiment of an oscillation drive circuit useful with the vibrating beam transducer of the invention.

FIG. 3 illustrates a representative oscillation circuit 100 in which vibrating beams 50, 52 of transducer 12 function as a resonator. A transimpedance amplifier 102 converts a sense current received from vibrating beams 50, 52 to a voltage. This voltage is filtered by a bandpass filter 104, which reduces noise, and its amplitude is controlled by an amplitude limiter 106. The resulting signal is combined with the output or DC bias voltage from a DC source 108 in a summing junction 110. The DC bias voltage generates a force between electrodes 62, 64 and beam 50, 52. The signal from amplitude limiter 106 modulates this force causing beams 50, 52 to vibrate laterally at their resonant frequency. This lateral beam motion, in turn, generates the sense current. An output buffer 112 isolates the oscillator from external circuitry connected to an output 114 of oscillation circuit 100. The gain in oscillation circuit 100 sustains the oscillation of beams 50, 52.

Obviously, many modifications and variations of the present invention are possible in light of the above teachings. Thus, it is to be understood that, within the scope of the appended claims, the invention may be practiced otherwise than as specifically described above.

What is claimed is:

1. A transducer comprising:
   a beam;
   an electrode deposited on the beam, wherein the electrode is formed of a material having properties as compared to gold of:
      a low radiation capture cross-section, and
      high electrical conductivity.

2. The transducer of claim 1, wherein the properties further include a low thermal coefficient of expansion.

3. The transducer of claim 1, wherein the properties further include being depositable on the beam in thin films according to conventional deposition methods.

4. The transducer of claim 1, wherein the material of which the electrode is formed is a material selected from a group of materials having the properties of a low radiation capture cross-section and high electrical conductivity.

5. The transducer of claim 1, wherein:
   the property of a low radiation capture cross-section further comprises a radiation capture cross-section to gamma radiation of less than 1 relative to gold, and
   the property of a high electrical conductivity further comprises an electrical conductivity greater than $5 \times 10^6$ Ohm-meters.

6. The transducer of claim 1, wherein the electrode is formed of a metal having the properties.

7. The transducer of claim 1, wherein the material of which the electrode is formed is a material selected from the group consisting of aluminum, chrome, and molybdenum.

8. The transducer of claim 1, wherein the beam comprises a first beam and further comprising a second beam, the first and second beams mechanically coupled at each of first and second ends, thereby forming a vibrating beam transducer.

9. A vibrating beam transducer having a metal electrode formed thereon, the transducer comprising:
   a plurality of vibrating beams; and
   a metal electrode formed on each of the vibrating beams, the metal selected from a group of metals having the properties of:
      a low radiation capture cross-section relative to gold, and
      an electrical conductivity comparable to gold.

10. The transducer of claim 9, wherein the metal of the electrode is selected from a group of metals having the properties of low thermal coefficient of expansion.

11. The transducer of claim 10, wherein the group of metals includes aluminum, chrome, and molybdenum.

12. The transducer of claim 9, wherein the radiation capture cross-section to gamma radiation relative to gold is less than 0.55, and the electrical conductivity is greater than $5 \times 10^6$ Ohm-meters.

13. A vibrating beam accelerometer, comprising:
   a substrate defining a first surface, the substrate having a frame and a proof mass suspended from the frame by one or more flexures;
   an active layer of semiconducting material coupled to the first surface of the substrate, wherein the active layer comprises a vibrating beam transducer mechanically coupled to the proof mass and the frame for detecting a force applied to the proof mass;
   an insulating layer between the active layer and the substrate to insulate the vibrating beam transducer from the substrate;
   a circuit coupled to the vibrating beam transducer of driving and sensing the vibrating beam transducer; and
   electrodes formed on the vibrating beam transducer of a material having a low radiation capture cross-section relative to gold.

14. The accelerometer of claim 13, wherein the electrode material formed on the vibrating beam transducer further comprises a material exhibiting an electrical conductivity comparable to that of gold.

15. The accelerometer of claim 13, wherein the material of the electrodes is deposited on beams of the vibrating beam transducer in thin films.

16. A method of forming a vibrating beam transducer, the method comprising:
   forming one or more beams capable of vibrating at a resonance frequency;
   depositing a thin film of an electrically and thermally conductive material as electrodes on the one or more beams, the electrically and thermally conductive material having a radiation capture cross-section to gamma radiation less than that of gold.

17. The method of claim 16, wherein the radiation capture cross-section to gamma radiation is less than 0.75.

18. The method of claim 16, wherein the thin film of material on the electrodes is depositable by conventional methods.

19. The method of claim 16, wherein the material on the electrodes exhibits an electrical conductivity comparable to gold, and a thermal conductivity comparable to gold.

20. The method of claim 16, wherein the material on the electrodes is a metal selected from a group of metals having the properties of:
   a low radiation capture cross-section relative to gold, and
   an electrical conductivity comparable to gold.

21. The method of claim 16, wherein the material on the electrodes is selected from the group consisting of aluminum, chrome, and molybdenum.

* * * * *